United States Patent
Ikeda (10) Patent No.: US 7,239,335 B2
(45) Date of Patent: Jul. 3, 2007

(54) APPARATUS AND METHOD FOR IMAGE FORMING CAPABLE OF PROCESSING AN IMAGE AT SUITABLE CLOCK SPEEDS

(75) Inventor: Yoshito Ikeda, Chiba-ken (JP)

(73) Assignee: Ricoh Company, Ltd, Tokyo (JP)

( * ) Notice: Subject to any disclaimer, the term of this patent is extended or adjusted under 35 U.S.C. 154(b) by 333 days.

(21) Appl. No.: 10/849,164

(22) Filed: May 20, 2004

(65) Prior Publication Data
US 2005/0024483 A1 Feb. 3, 2005

(30) Foreign Application Priority Data
May 20, 2003 (JP) .............................. 2003-141749

(51) Int. Cl.
*B41J 2/435* (2006.01)
(52) U.S. Cl. ...................................... 347/234; 347/248
(58) Field of Classification Search ........ 347/234–237, 347/240, 247–254
See application file for complete search history.

(56) References Cited

U.S. PATENT DOCUMENTS

| 4,679,096 A | 7/1987 | Nagashima |
| 4,905,022 A | 2/1990 | Nagasawa |
| 6,154,246 A * | 11/2000 | Ogasawara et al. ......... 347/250 |
| 6,654,042 B2 | 11/2003 | Ikeda |
| 2005/0024483 A1 | 2/2005 | Ikeda |

FOREIGN PATENT DOCUMENTS

| EP | 0 798 918 | 10/1997 |
| EP | 1 286 533 | 2/2003 |
| JP | 9-9021 | 1/1997 |
| JP | 11284858 A * | 10/1999 |

OTHER PUBLICATIONS

U.S. Appl. No. 10/102,853, filed Mar. 22, 2002, Ikeda.
U.S. Appl. No. 10/279,558, filed Oct. 25, 2002, Ikeda.
U.S. Appl. No. 10/653,893, filed Sep. 4, 2003, Ikeda.
U.S. Appl. No. 10/849,164, filed May 20, 2004, Ikeda.
U.S. Appl. No. 11/466,676, filed Aug. 23, 2006, Ikeda.

* cited by examiner

*Primary Examiner*—Hai Pham
(74) *Attorney, Agent, or Firm*—Oblon, Spivak, McClelland, Maier & Neustadt, P.C.

(57) ABSTRACT

An image forming apparatus and an image forming method. The image forming apparatus includes a scanner mechanism for reading out image data from an original document, and a printer mechanism for printing an image based on the image data. The printer mechanism includes a first memory for writing in the image data in synchronization with a predetermined first clock signal, a first image processor for processing the image data in synchronization with a second clock signal, a second memory for writing in the image data in synchronization with the second clock signal, a second image processor for processing the image data in synchronization with a third clock signal, and a light controller for generating a light control signal from the image data in synchronization with the third clock signal.

14 Claims, 6 Drawing Sheets

APPARATUS AND METHOD FOR IMAGE FORMING CAPABLE OF PROCESSING AN IMAGE AT SUITABLE CLOCK SPEEDS

BACKGROUND OF THE INVENTION

1. Field of the Invention

The present invention relates to an apparatus and method for image forming, and more particularly to an apparatus and method for image forming capable of processing an image at a plurality of clock speeds.

2. Discussion of the Background

Figure 1:
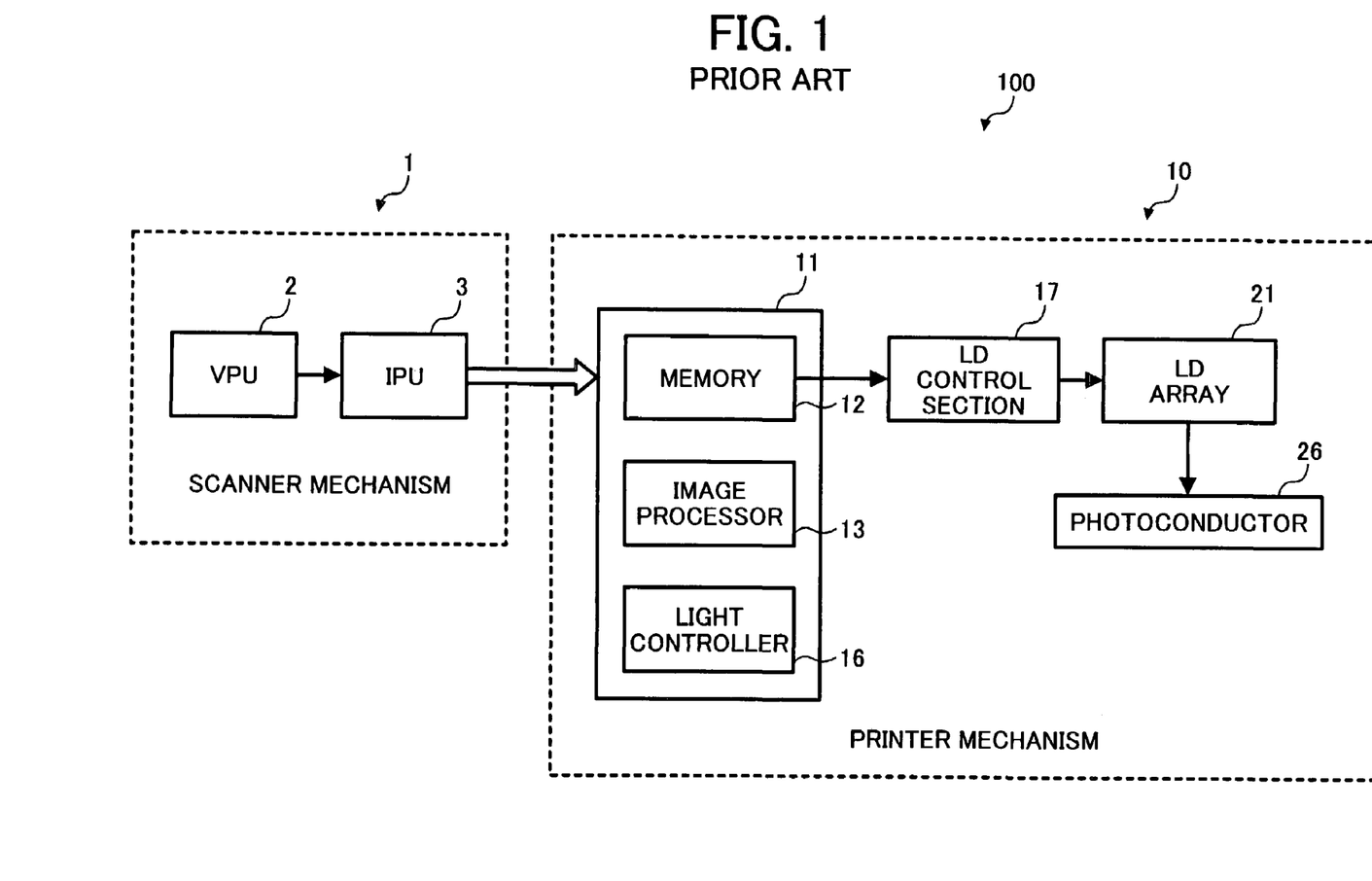
FIG. 1 is a block diagram illustrating a main part of a background image forming apparatus.

As shown in FIG. 1, a background image forming apparatus 100 for forming an image by use of light generally includes a scanner mechanism 1, a printer mechanism 10, a controller (not shown) and an operator (not shown). The scanner mechanism 1 reads image data from an original document. The printer mechanism 10 writes the image data by using a light control section 17 to modulate light emitted from a LD (laser diode) array 21, and forms a latent image on a photoconductor 26. Subsequently, the latent image is developed with toner by a developing device (not shown), and the resultant toner image is transferred onto a transfer sheet by a transfer device (not shown).

The printer mechanism 10 of the background image forming apparatus 100 includes a writing apparatus 11. The writing apparatus 11 of FIG. 1 has a memory 12, an image processor 13, and a light controller 16. The memory 12 receives the image data read out by the scanner mechanism 1 in synchronization with a predetermined input clock, and temporarily stores therein the image data. The image processor 13 applies various image processing on the image data read out from the memory 12. The light controller 16 outputs the processed image data as a light control signal. Based on the light control signal, the writing apparatus 11 modulates the light emitted from the LD array 21 to form the latent image on the photoconductor 26.

In this case, the light controller 16 outputs the light control signal in synchronization with a final clock having a frequency different from a frequency of the input clock. In other words, the input clock is converted to the final clock such that the timing of writing in the image data and the timing of reading out the image data can be synchronized with each other.

Recently, with an increased demand for higher printing speeds, an image forming apparatus capable of operating at higher final clock speeds is preferably used. However, the high-speed image forming apparatus produces a strong electromagnetic field such that complying with the EMI (electromagnetic interference) standard becomes harder. Installing shields or ferrites can certainly suppress the EMI, but by increasing the cost of the image forming apparatus.

SUMMARY OF THE INVENTION

Thus, the present inventors recognized there is a need for an image forming apparatus capable of operating at high speeds without generating a strong electromagnetic field.

In view of the foregoing, it is an object of the present invention to provide a novel image forming apparatus capable of forming an image at high speeds without generating a strong electromagnetic field.

Another object of the present invention is to provide a novel image forming method for forming an image at high speeds without generating a strong electromagnetic field.

Another object of the present invention is to provide a novel optical writing apparatus capable of effectively processing an image at a plurality of clock speeds.

Another object of the present invention is to provide a novel optical writing method for effectively processing an image at a plurality of clock speeds.

To achieve the above and other objects, in one example, a novel image forming apparatus mainly includes a scanner mechanism and a printer mechanism. The scanner mechanism generates image data based on an original document. The printer mechanism forms an image based on the image data by use of light emitted from a light source. Specifically, the printer mechanism includes a first memory, a first image processor, a second memory, a second image processor, and a light controller. The first memory writes in the image data in synchronization with a first clock signal. The first image processor processes the image data in synchronization with a second clock signal. The second memory writes in the image data in synchronization with the second clock signal. The second image processor processes the image data in synchronization with a third clock signal. The light controller generates a light control signal based on the image data in synchronization with the third clock signal.

Further, the second clock signal may have a frequency higher than a frequency of the first clock signal but lower than a frequency of the third clock signal.

To achieve the above and other objects, in one example, a novel image forming method includes operations of: generating, first writing, first reading, first processing, second writing, second reading, second processing, outputting, and forming. The generating generates image data from an original document. The first writing writes the image data in a first memory in synchronization with a first clock signal. The first reading reads out the image data from the first memory in synchronization with a second clock signal. The first processing step processes the image data in synchronization with the second clock signal. The second writing writes the image data in a second memory in synchronization with the second clock signal. The second reading reads out the image data from the second memory in synchronization with a third clock signal. The second processing processes the image data in synchronization with the third clock signal. The outputting outputs a light control signal based on the image data in synchronization with the third clock signal. The forming forms an image by use of light controlled by the light control signal.

Further, the second clock signal may have a frequency higher than a frequency of the first clock signal but lower than a frequency of the third clock signal.

To achieve the above and other objects, in one example, a novel optical writing apparatus includes a first memory block, a first image processor, a second memory block, a second image processor, and a light controller. The first memory writes in the image data in synchronization with a first clock signal. The first image processor processes the image data in synchronization with a second clock signal. The second memory writes in the image data in synchronization with the second clock signal. The second image processor processes the image data in synchronization with a third clock signal. The light controller generates a light control signal based on the image data in synchronization with the third clock signal.

To achieve the above and other objects, in one example, a novel optical writing method includes operations of a first writing, first reading, first processing, second writing, second reading, second processing, and outputting. The generating generates image data from an original document. The first writing writes the image data in a first memory in synchronization with a first clock signal. The first reading reads out the image data from the first memory in synchronization with a second clock signal. The first processing processes the image data in synchronization with the second clock signal. The second writing writes the image data in a second memory in synchronization with the second clock signal. The second reading reads out the image data from the second memory in synchronization with a third clock signal. The second processing processes the image data in synchronization with the third clock signal. The outputting outputs a light control signal based on the image data in synchronization with the third clock signal.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 2:
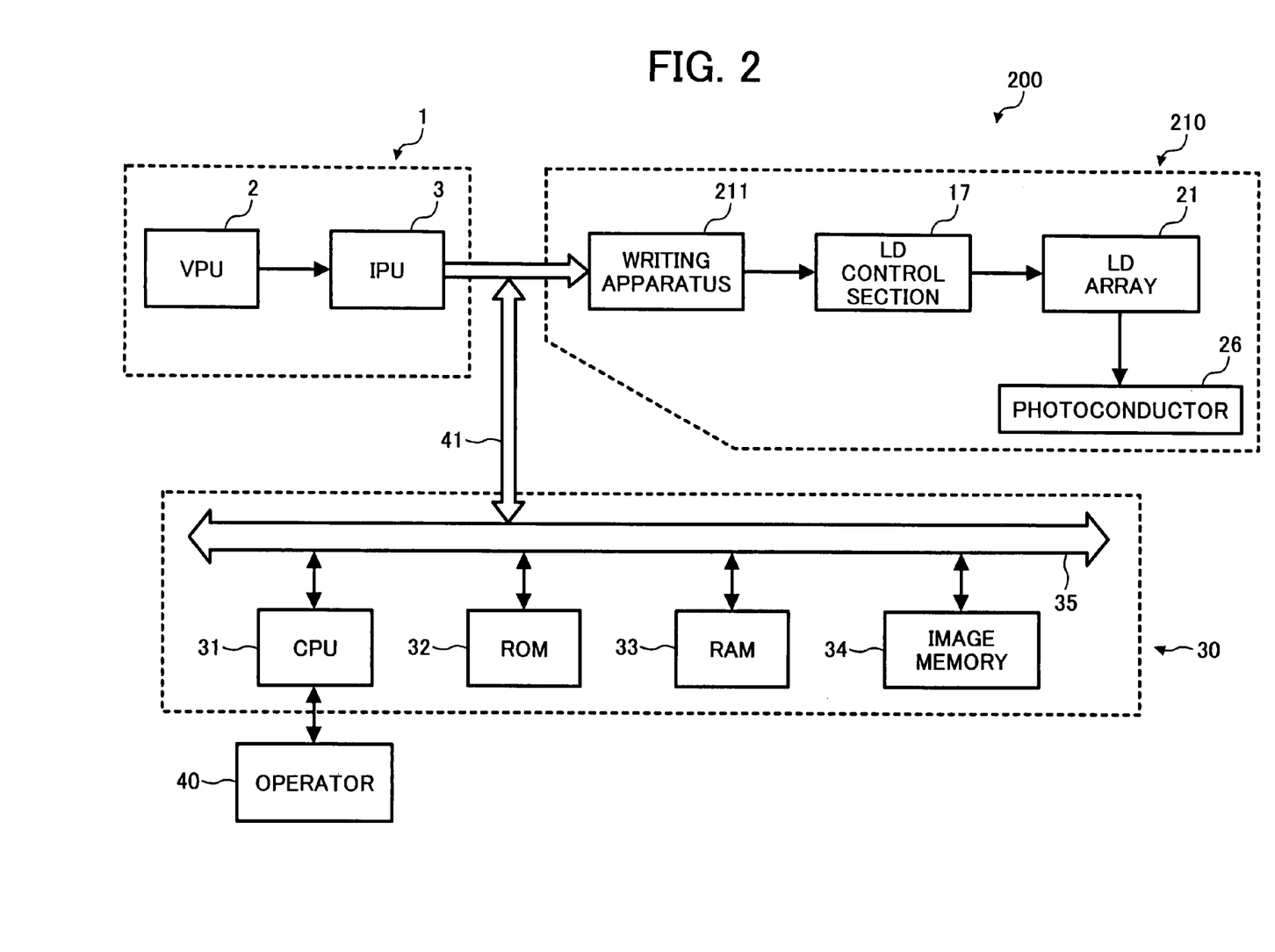
FIG. 2 is a block diagram illustrating a main part of a digital copier, according to an exemplary embodiment of the present invention.

Referring now to the drawings, wherein like reference numerals designate identical or corresponding parts throughout the several views, particularly to FIG. 2, a digital copier 200 according to an exemplary embodiment of the present invention is explained.

In FIG. 2, the digital copier 200 mainly includes the scanner mechanism 1, a printer mechanism 210, a controller 30 for controlling the operation of the digital copier 200, and an operator 40 connected to the controller 30. The controller 30 and the operator 40 are substantially similar to the controller and the operator of the background image forming apparatus 100, respectively. An I/F 41 connects the scanner mechanism 1, the printer mechanism 210, and the controller 30.

The scanner mechanism 1 mainly includes a VPU (Visual Processing Unit) 2 and an IPU (Image Processing Unit) 3. The VPU 2 receives image data read out from an original document, and performs optical/electrical conversion on the image data using a CCD (Charged Coupled Device, not shown). In addition, the VPU 2 converts the image data from analog to digital. The VPU 2 then applies black offset compensation, shading compensation, and pixel position compensation to the digital image data.

The IPU 3 practices predetermined image processing, such as resolution conversion or size conversion, on the image data that has been received from the VPU 2. The IPU 3 transmits the resultant image data to the controller 30 or to the printer mechanism 210.

The printer mechanism 210 mainly includes a writing apparatus 211, the LD control section 17, the LD array 21, and the photoconductor 26. The writing apparatus 211 may be implemented as an ASIC (Application Specific Integrated Circuit), for example, which controls the operation of the printer mechanism 210. The LD control section 17 controls light emitted from the LD array 21. In this example, the LD array 21 emits four lines of laser beams according to the image data. The LD array 21 can emit a single laser beam or more than four laser beams, if desired. As a result, an electrostatic latent image is formed on the photoconductor 26.

The controller 30 includes a CPU 31, a ROM 32, a RAM 33, and an image memory 34, which are all connected via a system bus 35. The ROM 32 previously stores various programs including a main program for operating the digital copier 200, and various kinds of data used by these programs. The CPU 31 controls various operations performed by the digital copier 200 based on the programs stored in the ROM 32. The RAM 33 serves as a work memory to be used by the CPU 31. The image memory 34 includes a RAM of large capacity or a hard disk, for example. Under the control of the CPU 31, the image memory 34 temporarily stores the image data read out by the scanner mechanism 1 or any other image data transmitted from an external device (not shown) such as a personal computer or a facsimile. The stored image data may be read out by the CPU 31 when necessary.

The operator 40 is provided with various kinds of operation keys including a start key or other functional keys. The operator 40 further includes a display (not shown) such as a liquid crystal display. Through the operation keys, a user can input various instructions for operating the digital copier 200. The display of the operator 40 displays the instructions input by the user or various kinds of information from the digital copier 200 to notify the user.

Figure 3:
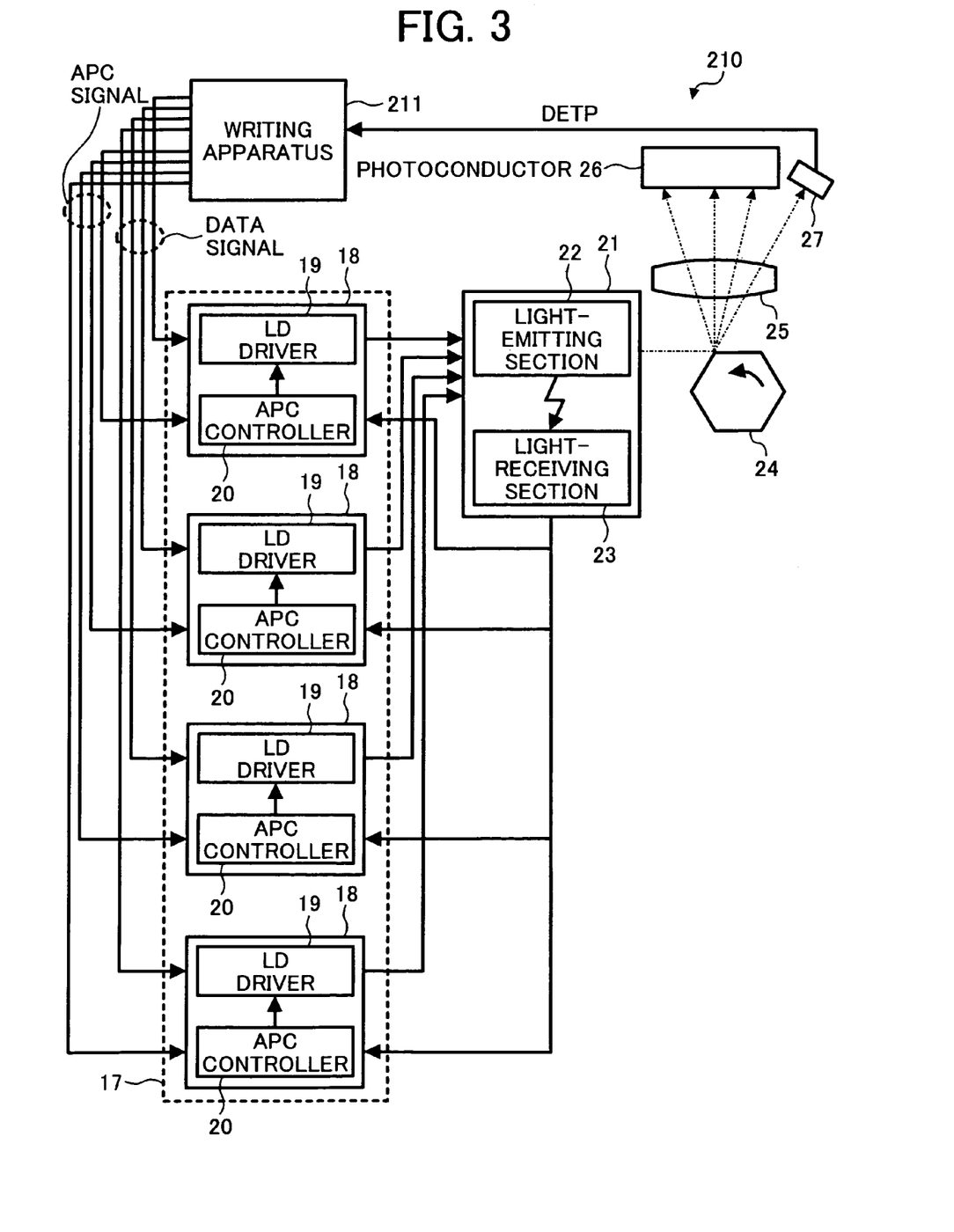
FIG. 3 is a circuit diagram illustrating a printer mechanism of the digital copier of FIG. 2.

The printer mechanism 210 of FIG. 2 is explained in more details with reference to FIG. 3.

The LD control section 17 of the printer mechanism 210 includes four LD drive controlling circuits 18 each provided with an LD driver 19 and an APC (Automatic Power Control) controller 20. The LD array 21 is provided with a light-emitting section 22 and a light-receiving section 23. The light-emitting section 22 includes four light-emitting elements such as LDs, while the light-receiving section 23 includes a single light-receiving element. In this case, the number of LD drive controlling circuits 18 or the number of light-emitting elements determines the number of the laser beams emitted from the LD array 21. Thus, the number varies depending on an image forming apparatus in use.

The printer mechanism 210 further includes a deflector 24, an fθ lens 25, and a light detector 27.

The laser beam emitted from the light-emitting section 22, or more specifically, the respective light-emitting elements, is collimated by a collimator lens (not shown). The laser beam thus collimated is periodically deflected by the deflector 24 including a rotatable polygon mirror. The laser beam thus reflected is focused on the surface of the photoconductor 26, that has been uniformly charged by a charger (not shown), by use of the fθ lens 25. The focused light spot is repeatedly moved and scanned in the axial direction of the photoconductor 26, namely, in the main scanning direction, by the rotation of the deflector 24. At the same time, the photoconductor 26 rotates in the sub-scanning direction.

Since the light-emitting section 22 of the LD array 21 includes four light-emitting elements in this example, four lines of laser beams different in position in the sub-scanning direction (i.e., rotational direction of the photoconductor 26) are drawn on the surface of the photoconductor 26. In this way, the electrostatic latent image is formed on the surface of the photoconductor 26.

The electrostatic latent image is then developed with toner by a developing device (not shown) to form a toner image. The toner image is transferred onto a transfer sheet, for example, fed by a sheet feeding device (not shown) by use of a transfer device (not shown).

The light detector 27 is provided on the area outside of the scanning writing area on the photoconductor 26. Therefore, the laser beam, which has been deflected by the deflector 24, passes through the light detector 27 before scanning the surface of the photoconductor 26. The light detector 27 detects the laser beam and outputs a synchronization detecting signal DETP to the writing apparatus 211. The synchronization detecting signal DETP is based on a line cycle of the digital copier 200, and is used to determine a position where the writing starts in the main scanning direction on the photoconductor 26.

The writing apparatus 211 outputs four data signals to the respective LD drivers 19 based on the synchronization detecting signal DETP. The writing apparatus 211 also provides four APC signals to the respective APC controllers 20 based on the synchronization detecting signal DETP.

The LD driver 19 drives the light-emitting section 22 according to the data signal and the APC signal so that the light-emitting section 22 emits the laser beam. The laser beam emitted from the light-emitting section 22 is directed as incident light on the light-receiving section 23. The light-receiving section 23 detects the intensity of the laser beam, and outputs a light-receiving signal corresponding to the detected intensity to the respective APC controller 20.

The APC controller 20 controls the LD driver 19 according to the light-receiving signal received from the light-receiving section 23. The APC controller 20 further controls a light-emitting level of the light-emitting section 22 so as to make the light-emitting level constant. In other words, the APC controller 20 performs a so-called APC control operation. In the APC control operation, a current flowing through the light-emitting element is controlled so as to equalize the light-receiving signal. As a result, the voltage of a drive power source of the corresponding light-emitting element in the LD array 21 is adjusted and held, such that the light-emitting level becomes constant.

Figure 4:
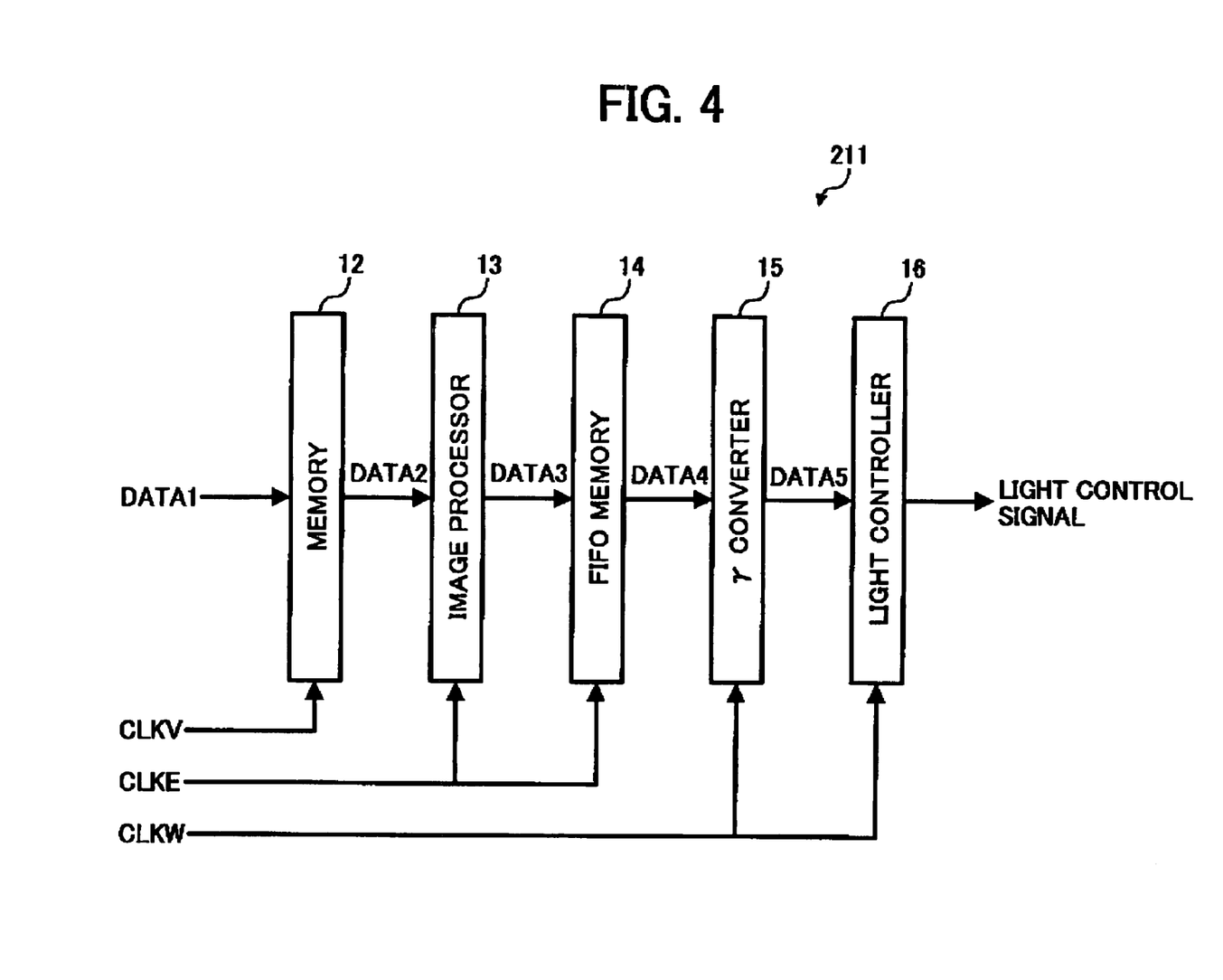
FIG. 4 is a block diagram illustrating a structural example of a writing apparatus of the digital copier of FIG. 2.

FIG. 4 is a block diagram for illustrating a structural example of the writing apparatus 211 of FIG. 2. The writing apparatus 211 of FIG. 4 has a structure substantially the same as the structure of the writing apparatus 11 of FIG. 1, except that the writing apparatus 211 further includes a FIFO memory 14 and a γ converter 15.

The memory 12 receives image data DATA1 from the scanner mechanism 1 in synchronization with an input clock CLKV. The stored image data DATA1 is then output line by line to the image processor 13, as image data DATA 2, in synchronization with an intermediate clock CLKE.

The image processor 13 applies various image processing and pattern compositions, to the image data DATA2, and outputs image data DATA3. The FIFO memory 14 receives the image data DATA3 from the image processor 13 in synchronization with the intermediate clock CLKE. After storing therein the image data DATA3, the FIFO memory 14 outputs image data DATA4 line by line to the γ converter 15 in synchronization with a final clock CLKW.

The γ converter 15 receives the image data DATA4 in synchronization with the final clock CLKW. The γ converter 15 then applies various image processing, such as duty conversion, on the image data DATA4, and outputs image data DATA5. The light controller 16 adds the APC signal to the image data DATA5, and outputs a light control signal to the LD control section 17 in synchronization with the final clock CLKW.

Figure 5:
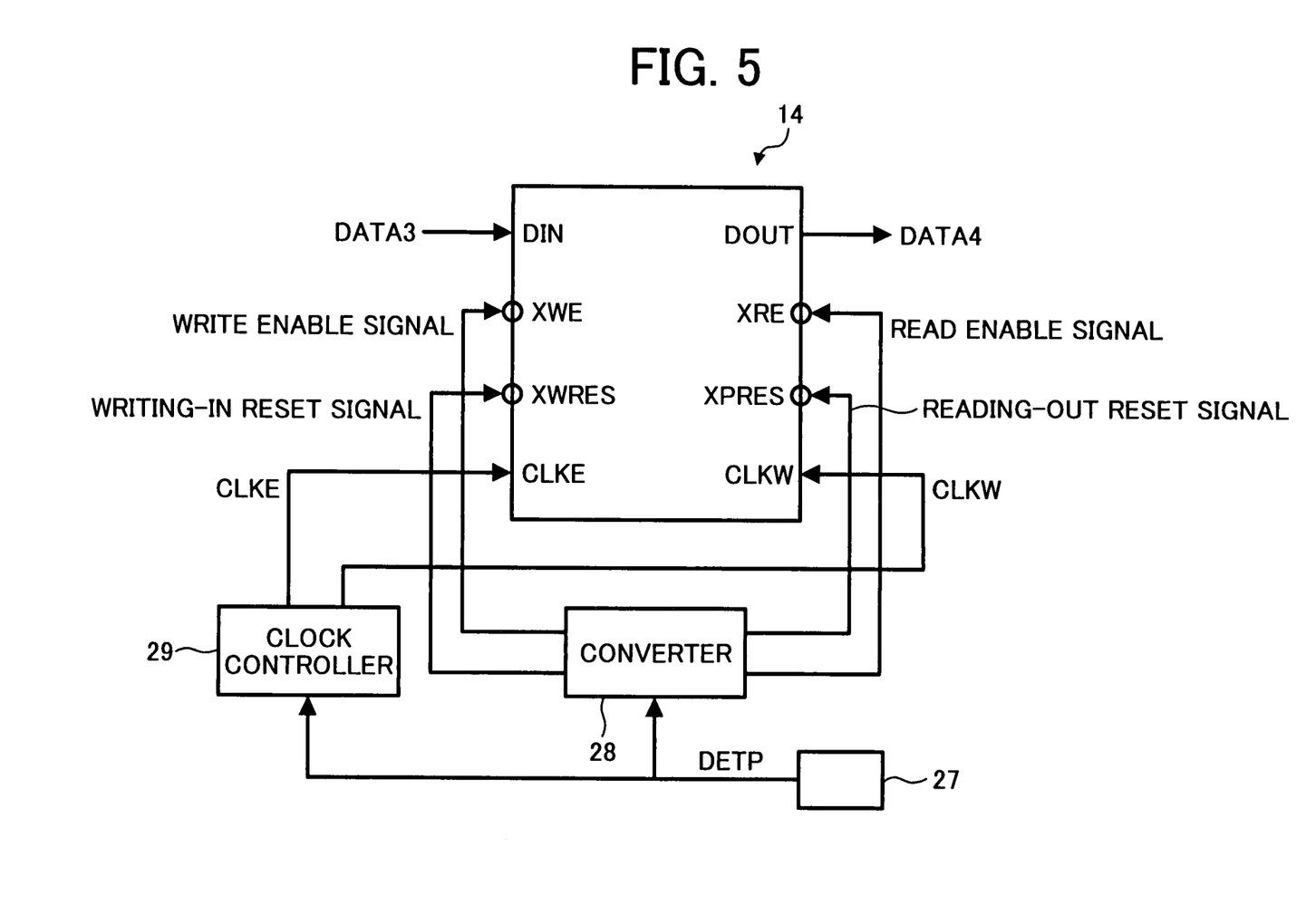
FIG. 5 is a block diagram illustrating terminals of a FIFO memory of the writing apparatus of FIG. 4.

The FIFO memory 14 of FIG. 5 is implemented as a First-in First-out memory, however, any storage medium capable of independently practicing the writing-in operation and the reading-out operation of image data can be used.

FIG. 5 shows the terminals of the FIFO memory 14 and the circumferential circuits thereof. Referring now to FIG. 5, the operation of the FIFO memory 14 is explained in more details. The FIFO memory 14 includes terminals Din, Dout, XWE, XRE, XWRES, XPRES, CLKE, and CLKW. The FIFO memory 14 further includes a writing-in address pointer (not shown) for pointing the writing-in address, and a reading-out address pointer (not shown) for pointing the reading-out address. FIG. 5 also illustrates the light detector 27, a converter 28, and a clock controller 29.

The terminal Din receives the image data DATA3 from the image processor 13. The terminal Dout outputs the image data DATA4 to the γ converter 15. The converter 28 generates a write enable signal, a read enable signal, a writing-in reset signal, and a reading-out reset signal, all based on the synchronization detecting signal DETP output from the light detector 27. The terminal XWE receives the write enable signal. The terminal XRE receives the read enable signal. The terminal XWRES receives the writing-in reset signal. The terminal XPRES receives the reading-out reset signal. The terminal CLKE receives the intermediate clock CLKE generated by the clock controller 29 based on the synchronization detecting signal DETP. The terminal CLKW receives the final clock CLKW generated by the clock controller 29 based on the synchronization detecting signal DETP.

When the terminal XWRES receives the writing-in reset signal, the writing-in address pointer resets the writing-in address to be pointed to "0". When the terminal XWE is activated by the write enable signal, the image data received at the terminal Din is written in the address pointed by the writing-in address pointer based on the intermediate clock CLKE. As a result, the writing-in address pointer is incremented by one. This process is repeated until the writing-in address reaches the last address of the FIFO memory 14.

When the writing-in address reaches the last address of the FIFO memory 14, the terminal XPRES receives the reading-out reset signal, and the reading-out address pointer resets the reading-out address to be pointed to "0". When the terminal XRE is activated by the reading enable signal, the image data written in the address pointed by the reading-out address pointer is output from the Dout terminal based on the final clock CLKW. As a result, the reading-out address pointer is incremented by one. This process is repeated until the reading-out address reaches the last address of the FIFO memory 14.

In this way, the FIFO memory 14 can perform the writing-in operation and the reading-out operation at different clock speeds but based on the same line cycle.

The memory 12 has a structure and a function that are similar to the structure and the function of the FIFO memory 14, except that the writing-in operation is performed based on the input clock CLKV and the reading-out operation is performed based on the intermediate clock CLKE.

The clock controller 29 of FIG. 5 includes a PLL (Phase Locked Loop) circuit (not shown) provided with a frequency divider (not shown). Therefore, the clock controller 29 can generate the intermediate clock CLKE and the final clock CLKW based on the input clock CLKV in synchronization with the synchronization detecting signal DETP.

Alternatively, two PLL circuits may be provided such that one generates the intermediate clock CLKE and the other generates the final clock CLKW.

Further, the PLL circuit may be replaced with any kind of oscillators such as a crystal oscillator. However, the PLL circuit is desirably used such that the input clock CLKV can be automatically or manually changed according to various image forming conditions including the density of an image or the linear speed of an image forming apparatus in use.

Furthermore, it is preferable to set the frequency of the intermediate clock CLKE lower than that of the final clock CLKW. Specifically, in this example, the digital copier 200 has an effective writing width of 300 mm, an effective scanning rate of 60%, a line cycle of 300 µs, and a writing resolution of 1200 dpi. Thus, the final clock CLKW is 78.7 MHz based on the following calculation.

$$CLKW = 300 \text{ mm} \times 1200 \text{ dpi}/(300 \text{ µs} \times 60\% \times 25.4 \text{ mm/inch}) = 78.7 \text{ MHz}$$

In this case, the effective scanning rate of 60% is used, however, any number of effective scanning rates preferably from 60% to 70% may be used.

For the intermediate clock CLKE, the effective scanning rate may be increased to 95%, for example. Thus, the intermediate clock CLKE is 49.7 MHz based on the following calculation.

$$CLKE = 300 \text{ mm} \times 1200 \text{ dpi}/(300 \text{ µs} \times 95\% \times 25.4 \text{ mm/inch}) = 49.7 \text{ MHz}$$

In such a case, the input clock CLKV has an effective scanning rate of greater than 95% but less than 100%.

Figure 6:
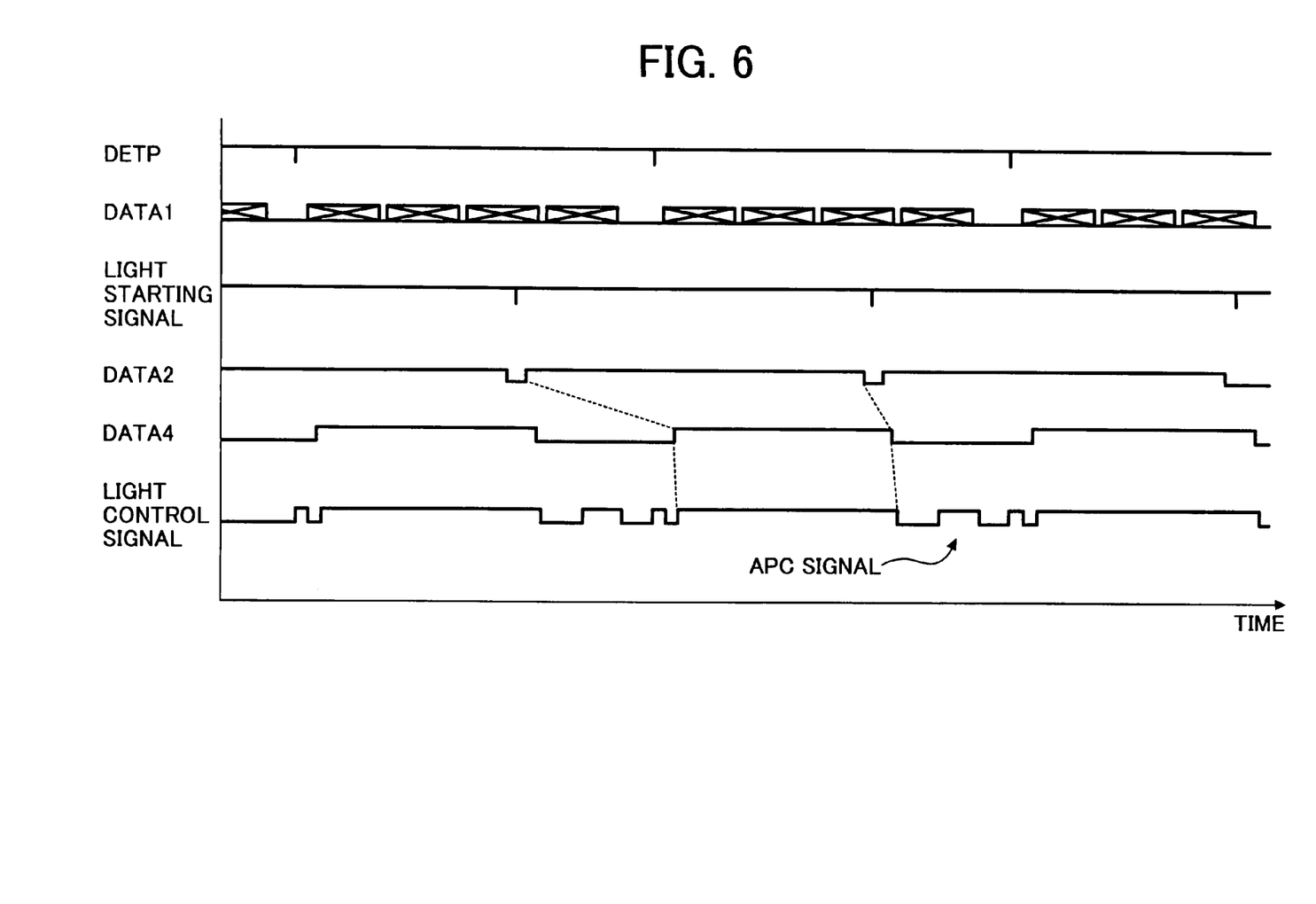
FIG. 6 is a timing chart illustrating an operation example of a writing apparatus of FIG. 4.

FIG. 6 is a timing chart illustrating the operation of the wiring apparatus 211.

As shown in FIG. 6, the writing apparatus 211 receives the image data DATA1 from the scanner mechanism 1 based on the synchronized detecting signal DETP. In this example, the image data DATA1 includes four lines of data.

The image data DATA1 is then input to the memory 12 based on a line starting signal generated based on the synchronization detecting signal DETP. The line starting signal serves as a writing-in reset signal for the memory 12. Thus, the memory 12 starts writing in the image data DATA1 after receiving the writing-in reset signal, i.e., the line starting signal, based on the input signal CLKV.

After the image processor 13 applies various information processing to the image data DATA2, the image data DATA3 is input to the FIFO memory 14. As described earlier, the FIFO memory 14 writes in the image data DATA3 after receiving the writing-in reset signal based on the intermediate clock CLKE. Then, the FIFO memory 14 outputs the image data DATA4 based on the final clock CLKW.

Subsequently, the γ converter 15 applies various image processing to the image data DATA4, and outputs the image data DATA5 to the light controller 16. The light controller 16 adds the APC control signal to the image data DATA5, and outputs the light control signal to the light control section 17. As a result, the electrostatic latent image is formed on the photoconductor 26 according to the image data DATA1.

As illustrated above, the image forming apparatus 200 performs various image processing at a plurality of clock speeds (in this example, three different clocks including the input clock CLKV, the intermediate clock CLKE, and the final clock CLKW) so that the level of EMI generated from the image forming apparatus 200 can be reduced.

The present invention may be implemented using one or more conventional general purpose microprocessors and/or signal processors programmed according to the teachings of the present disclosure, as will be appreciated by those skilled in the relevant art(s). Appropriate software coding can readily be prepared by skilled programmers based on the teachings of the present disclosure, as will also be apparent to those skilled in the relevant art(s).

Alternatively, as mentioned earlier, the present invention may be implemented by ASIC, prepared by interconnecting an appropriate network of conventional component circuits or by a combination thereof with one or more conventional general purpose microprocessors and/or signal processors programmed accordingly.

The present invention thus also includes a computer-based product that may be hosted on a storage medium and that includes instructions which can be used to program a microprocessor to perform a process in accordance with the present invention. This storage medium can include any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

This patent document claims priority to and is based on Japanese patent application, No. JPAP 2003-141749 filed on May 20, 2003, in the Japanese Patent Office, the entire contents of which are hereby incorporated by reference herein.

The invention claimed is:

1. An image forming apparatus, comprising:
   a scanner mechanism configured to generate image data based on an original document; and
   a printer mechanism configured to print an image based on the image data using light emitted from a light source,
   the printer mechanism comprising:
   a first memory block configured to write in the image data in synchronization with a first clock signal;
   a first image processor configured to process the image data in synchronization with a second clock signal;
   a second memory block configured to write in the image data in synchronization with the second clock signal;
   a second image processor configured to process the image data in synchronization with a third clock signal; and
   a light controller configured to generate a light control signal from the image data in synchronization with the third clock signal, wherein a frequency of the second clock signal is higher than a frequency of the first clock signal and lower than a frequency of the third clock signal.

2. The apparatus of claim 1, wherein the second memory block includes a first-in first-out (FIFO) memory.

3. The apparatus of claim 1, wherein the second image processor is configured to process the image data according to a duty conversion algorithm.

4. The apparatus of claim 1, wherein the printer mechanism further comprises a clock controller including at least one phase locked loop (PLL) circuit.

5. The apparatus of claim 1, wherein the printer mechanism further comprises a clock controller including two phase locked loop (PLL) circuits.

6. The apparatus of claim 1, wherein the first clock signal has an effective scanning rate of greater than 95% and less than 100%.

7. The apparatus of claim 1, wherein the third clock signal has an effective scanning rate of 60% to 70%.

8. An optical writing apparatus, comprising:
- a first memory block configured to write in image data in synchronization with a first clock signal;
- a first image processor configured to process the image data in synchronization with a second clock signal;
- a second memory block configured to write in the image data in synchronization with the second clock signal;
- a second image processor configured to process the image data in synchronization with a third clock signal; and
- a light controller configured to generate a light control signal from the image data in synchronization with the third clock signal, wherein a frequency of the second clock signal is higher than a frequency of the first clock signal and lower than a frequency of the third clock signal.

9. The apparatus of claim 8, wherein the second memory block includes a first-in first-out (FIFO) memory.

10. The apparatus of claim 8, wherein the second image processor is configured to process the image data according to a duty conversion algorithm.

11. The apparatus of claim 8, wherein the printer mechanism further comprises a clock controller including at least one phase locked loop (PLL) circuit.

12. The apparatus of claim 8, wherein the printer mechanism further comprises a clock controller including two phase locked loop (PLL) circuits.

13. The apparatus of claim 8, wherein the first clock signal has an effective scanning rate of greater than 95% and less than 100%.

14. The apparatus of claim 8, wherein the third clock signal has an effective scanning rate of 60% to 70%.

* * * * *